US012810307B2

(12) United States Patent
Zhu et al.

(10) Patent No.: US 12,810,307 B2
(45) Date of Patent: Nov. 24, 2026

(54) REAL-TIME PRODUCT ENVIRONMENTAL IMPACT SCORING

(71) Applicant: Capital One Services, LLC, McLean, VA (US)

(72) Inventors: Xiaoguang Zhu, New York, NY (US); Vyjayanthi Vadrevu, Pflugerville, TX (US); Lin Ni Lisa Cheng, New York, NY (US)

(73) Assignee: Capital One Services, LLC, McLean, VA (US)

(*) Notice: Subject to any disclaimer, the term of this patent is extended or adjusted under 35 U.S.C. 154(b) by 216 days.

(21) Appl. No.: 17/480,229

(22) Filed: Sep. 21, 2021

(65) Prior Publication Data

US 2023/0089850 A1 Mar. 23, 2023

(51) Int. Cl.
*G06Q 30/018* (2023.01)
*G06F 16/22* (2019.01)
(Continued)

(52) U.S. Cl.
CPC .......... *G06Q 30/018* (2013.01); *G06F 16/22* (2019.01); *G06Q 10/087* (2013.01);
(Continued)

(58) Field of Classification Search
CPC ............... G06Q 30/018; G06Q 10/087; G06Q 30/0201; G06Q 30/0623; G06Q 30/0282; G06Q 30/0631; G06Q 50/01; G06F 16/22; G06F 16/9535; G06F 18/00; G06F 40/279; G06V 30/41
See application file for complete search history.

(56) References Cited

U.S. PATENT DOCUMENTS 8,170,923 B1 5/2012 Brandwine et al.
8,190,486 B1 5/2012 Ouimet
(Continued)

FOREIGN PATENT DOCUMENTS

WO 2008082631 A1 7/2008

OTHER PUBLICATIONS

Tomlinson, "Prototyping a Community-Generated, Mobile Device-Enabled Database of Environmental Impact Reviews of Consumer Products," Proceedings of the 41st Annual Hawaii International Conference on System Sciences (HICSS 2008), Waikoloa, HI, USA, 2008, pp. 154-154 (Year: 2008).*
(Continued)

*Primary Examiner* — Rutao Wu
*Assistant Examiner* — Sarjit S Bains
(74) *Attorney, Agent, or Firm* — Sterne, Kessler, Goldstein & Fox P.L.L.C.

(57) ABSTRACT

Disclosed herein are system, method, and computer program product embodiments for utilizing non-RAM memory to implement environmental impact scoring. An embodiment operates by identifying environmental impact components associated with a product, calculating the environmental impact value for each of the environmental impact components to generate a plurality of environmental impact values and scoring the product based on the plurality of environmental impact values to reflect an environmental impact score. Environmental impact scores may be displayed for customer consideration during a potential purchase.

20 Claims, 6 Drawing Sheets

100

(51) Int. Cl.

| | |
|---|---|
| ***G06F 40/279*** | (2020.01) |
| ***G06Q 10/087*** | (2023.01) |
| ***G06Q 30/0201*** | (2023.01) |
| ***G06Q 30/0282*** | (2023.01) |
| ***G06Q 30/0601*** | (2023.01) |
| *G06F 16/9535* | (2019.01) |
| *G06F 18/00* | (2023.01) |
| *G06Q 10/40* | (2026.01) |

(52) U.S. Cl.

CPC ..... *G06Q 30/0201* (2013.01); *G06Q 30/0623* (2013.01); *G06F 16/9535* (2019.01); *G06F 18/00* (2023.01); *G06F 40/279* (2020.01); *G06Q 10/40* (2026.01); *G06Q 30/0282* (2013.01); *G06Q 30/0631* (2013.01)

(56) References Cited

U.S. PATENT DOCUMENTS

| | | | | |
|---|---|---|---|---|
| 8,214,258 | B2 | 7/2012 | Pauly et al. | |
| 8,296,101 | B1 * | 10/2012 | Barlow | G01B 21/00 702/182 |
| 9,524,518 | B1 * | 12/2016 | Singer | G06Q 30/0603 |
| 10,769,700 | B2 | 9/2020 | Hamilton, II et al. | |
| 2006/0089851 | A1 | 4/2006 | Silby et al. | |
| 2009/0119023 | A1 * | 5/2009 | Zimmer | G06Q 30/00 702/22 |
| 2010/0241253 | A1 * | 9/2010 | Edwards | G06Q 10/06 715/764 |
| 2010/0274612 | A1 * | 10/2010 | Walker | G05B 19/41865 700/297 |
| 2013/0054332 | A1 * | 2/2013 | Ross | G06Q 30/02 705/14.25 |
| 2013/0132233 | A1 * | 5/2013 | Rothley | G06Q 30/018 705/26.35 |
| 2013/0346247 | A1 | 12/2013 | Bash et al. | |
| 2014/0095263 | A1 * | 4/2014 | McAlister | G06Q 30/0206 705/7.35 |
| 2015/0066687 | A1 * | 3/2015 | Blackhurst | G06Q 30/0631 705/26.7 |
| 2015/0134550 | A1 * | 5/2015 | Sroufe | G06Q 30/018 705/317 |
| 2016/0034909 | A1 * | 2/2016 | Zhu | G06Q 30/0609 705/26.35 |
| 2016/0195566 | A1 | 7/2016 | Vock et al. | |
| 2017/0351978 | A1 | 12/2017 | Bellowe | |
| 2018/0025365 | A1 | 1/2018 | Wilkinson et al. | |
| 2018/0158127 | A1 * | 6/2018 | Hamilton, II | G06Q 90/00 |
| 2018/0300793 | A1 * | 10/2018 | Chen | G06Q 30/0631 |
| 2020/0258094 | A1 * | 8/2020 | Abrams | G06Q 30/018 |
| 2021/0287275 | A1 * | 9/2021 | Karlan-Mason | G06F 16/3331 |
| 2021/0383405 | A1 * | 12/2021 | Mostyn | G06Q 20/203 |
| 2023/0061787 | A1 * | 3/2023 | Feickert | G06Q 10/06375 |

OTHER PUBLICATIONS

International Search Report and Written Opinion directed to related International Patent Application No. PCT/US2022/076286, mailed Nov. 23, 2022, 13 pages.

* cited by examiner

REAL-TIME PRODUCT ENVIRONMENTAL IMPACT SCORING

BACKGROUND

Consumers increasingly value being environmentally responsible for the products they purchase. However, consumers must rely on manufacturers and vendors to accurately identify environmental impacts of their products, like sustainably harvested or environmentally friendly, etc. Independent evaluations may be spotty and limited to government sources, trade organizations or environmental organizations. The current process lacks a uniform unbiased opinion on various elements related to a product's environmental impact.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
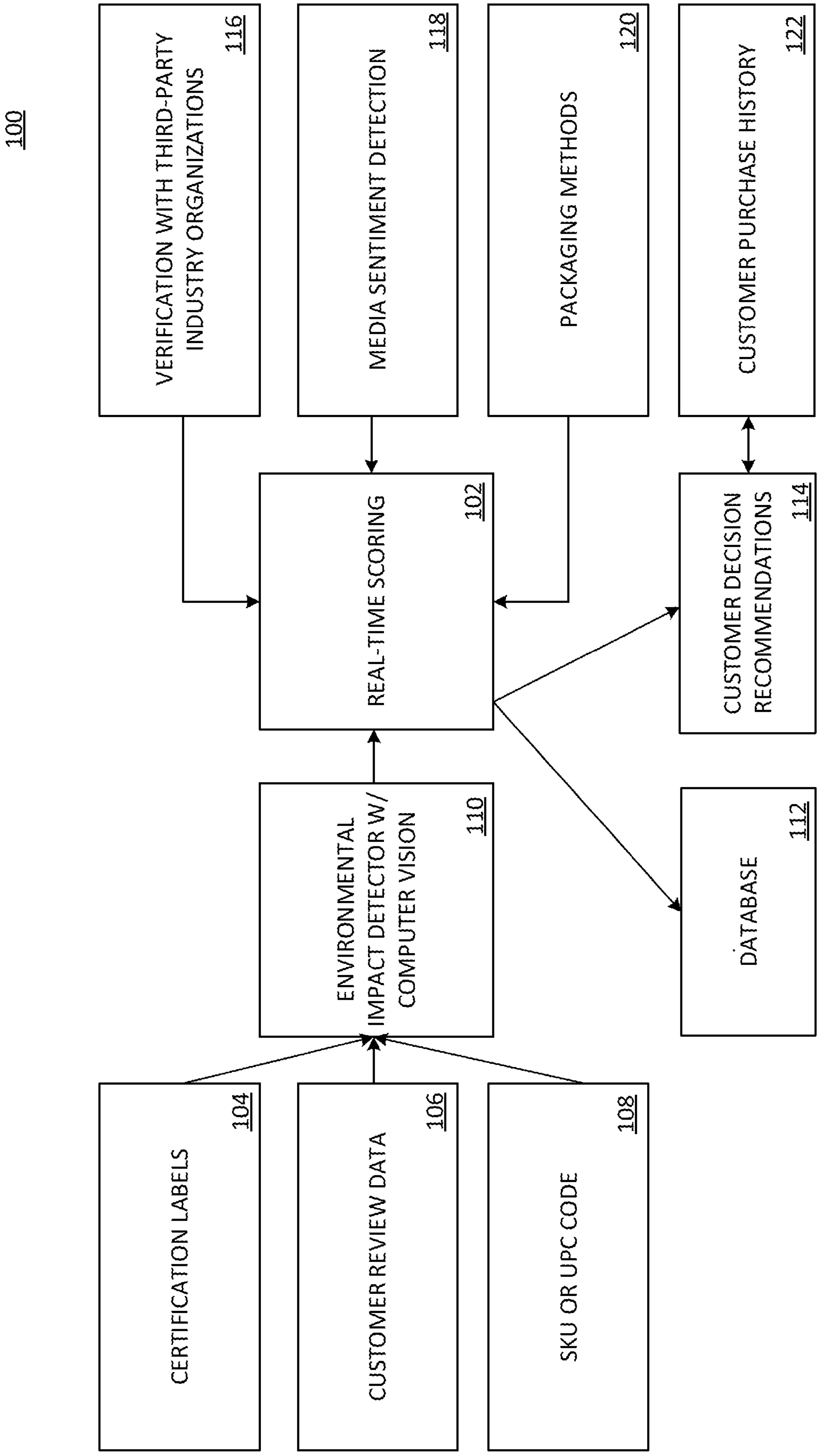
FIG. 1 is a block diagram of a real-time environmental impact system, according to some embodiments.

Provided herein are system, apparatus, device, method and/or computer program product embodiments, and/or combinations and sub-combinations thereof, for scoring products for purchase according to their environmental impact. Environmental impact may include, but is not limited to, carbon footprint, recyclability, product materials, packaging materials/sizing, shipping methods, and purchases by a consumer from sustainable manufacturers or producers, etc. Consumers increasingly value being environmentally responsible for the products they purchase. In some embodiments, to assist consumers with a purchase decision, the technology described herein provides a real-time environmental impact score system at the point of sale (online and in-store). In some embodiments, the technology described herein provides consumers with an unbiased score/assessment with verified and third party data (not only relying on what the manufacturer promotes). In one non-limiting example, the technology described herein may prevent "Green Wash" (false environmental marketing).

In some embodiments, the technology described herein is configured to implement SKU-level environmental impact detection. Stock Keeping Unit (SKU) refers to a scannable bar code, commonly used as a printed label applied to products or product packaging. This label provides a mechanism for vendors to automatically track movement of product inventory. The bar code reflects character codes that track price, product details, and the manufacturer. Alternately, or in addition to, a Universal Product Code (UPC) may be detected. The UPC is a type of printed code applied or printed on product packaging to identify a particular item. The code consists of a machine-readable bar code and twelve-digit identifier. The SKU or UPC codes, separately or in combination, identify the product and manufacturer.

In some embodiments, the technology described herein implements computer vision technology to automatically analyze and detect relevant environmental components from packaging or packaging images. These computer vision processes may be performed in advance of consumer shopping experiences or be performed in real-time, such as, while consumers are clicking on a product online. In some embodiments, the shopper may, for in-store purchases, capture a photo of the packaging that may subsequently be analyzed using computer vision techniques. In some embodiments, the technology described herein detects, using computer vision systems, various labels or labelling that may identify product components, such as, certification components, a United States Department of Agriculture (USDA) label or recyclable packaging label.

In some embodiments, the computer vision system may analyze manufacturer product packaging or vendor product packaging to further identify materials associated with the product and identify these materials as environmental impact components. In a non-limiting example, computer vision techniques may use known material identification techniques, including, but not limited to machine-learning methods to identify packaging materials. Non-limiting examples of materials include, paper, plastic, cardboard, polystyrene foam (XPS), synthetics, metals or wood.

In some embodiments, the technology disclosed herein is configured to locate and analyze customer review data on environmental impact from merchant sites, consumer sites or third party review sites.

In some embodiments, the technology disclosed herein computes real-time scoring on a number of metrics (e.g., product environmental impact, packaging environmental impact, shipping environmental impact, manufacturer reputation, carbon footprint calculation, etc.). These metrics may be derived from a number of data sources, such as SKU-level product detail discovery, social media on recent events reflecting a manufacturer's reputation, verification information based on industry organization recognition or government certification (e.g., fair trade, USDA, blockchain data on supply chain, etc.), environmental impact score databases capturing previous assessments for existing or known products, etc. In a non-limiting example, environmental impact scoring may include multiple scoring sources implemented as a composite score.

In some embodiments, the technology disclosed herein provides consumers with several decision aid metrics, such as a consumer product environmental impact assessment, a consumer's monthly level of being environmentally responsible from historical transaction data, ways to offset (e.g., carbon neutral) by donating or redirects to another merchant site where a same or similar, but more environmentally friendly product is available. Carbon footprint calculations are well known to one skilled in the art and may vary without departing from the scope of the technology described herein. While described for an online shopping experience, environmental impact scores or equivalent labels may be included with in-store products, packaging or marketing materials.

One benefit of the technology described herein may be achieved by assessing environmental impact in real-time. Existing systems may not address environmental impact at the time of purchase and therefore fail to affect the decision process. This technology provides consumers third-party verified environmental impacts of products and may take into account an individual customers' goal on being sustainable and, when a product of interest to the consumer is not highly sustainable, may recommend alternative sustainable products.

FIG. 1 illustrates a real-time environmental impact system. System 100 can be implemented by processing logic that can comprise hardware (e.g., circuitry, dedicated logic, programmable logic, microcode, etc.), software (e.g., instructions executing on a processing device), or a combination thereof. It is to be appreciated that not all elements may be needed to perform the disclosure provided herein. Further, some of the individual workflows described may be performed simultaneously, or in a different order than shown in FIG. 1, as will be understood by a person of ordinary skill in the art.

As shown, real-time scoring system 100 may be configured to capture and process data points from a plurality of environmental impact data sources. While specific sources are described herein, one skilled in the art will recognize that alternative sources, both current and future, may be substituted without departing from the scope of the technology described herein.

In some embodiments, real-time scoring module 102, calculates scores based on a plurality of data points. In an exemplary embodiment, these data points may be generated from product identifiers, such as certification labels 104 (e.g., a Marine Stewardship Council (MSC) label) 104 or SKU/UPC codes 108 located on products or product packaging. An additional data point may include, but not be limited to, customer review data 106. Customer review data may include such items as merchant site reviews, third party reviews, consumer or product testing reviews, social media reviews, etc. Environmental impact detector 110 may be configured to recognize environmental impact components of these various data points. More specifically, environmental impact detector 110 may be configured with computer vision to interpret imagery (labels, text, symbols, codes, numbers, graphics or audio) contained within this imagery or associated with it.

In a first non-limiting example, computer vision processing may be configured to extract environmental impact data by conversion of image data to text or codes. Environmental impact detector 110 may obtain label imagery, such as certification labels 104 or SKU/UPS labels, through web site imagery, consumer generated imagery, or by imagery provided by a product manufacturer or distributer, to name a few possible sources. Computer vision processing (e.g., scanning, optical character recognition (OCR), etc.) may convert the imagery into links to product information (e.g., Hyper-Text Markup Language (HTML) links). In some embodiments, the product information may then be scraped (FIG. 2) to extract salient environmental impact information.

In a second non-limiting example, computer vision processing may be configured to extract environmental impact data by conversion of customer review data to text or numbers. Environmental impact detector 110 may obtain the customer review data imagery through website imagery, consumer generated imagery, third-party product reviews or by imagery provided by a product manufacturer or distributer, to name a few possible sources. Computer vision processing (e.g., optical character recognition (OCR)) may convert the imagery into text. The product information may then be scraped (FIG. 2) to extract salient environmental impact information. Alternately, or in addition to, any of the source data may be pre-stored as text information, accessed by the real-time environmental impact system and subsequently scraped to identify the environmental impact information. Any known or future computer vision system or extraction technique may be substituted without departing from the scope of the technology described herein.

In some embodiments, an additional environmental impact source may include verification with third-party industry organizations 116. In one non-limiting example, food groups commonly have trade associations or government regulators (e.g., USDA) that will regulate terminology that may be placed on packaged products like "organic", "all natural", "sustainably farmed" "sustainably raised", etc. During regulatory compliance processes, reports of companies or products not meeting or misusing these terms may be generated. These regulatory compliance documents may then be scraped for specific product or manufacturer compliance issues. Continuing with this example, these food groups may also set standards of purity, use of pesticides, and other standards that may suggest or discuss environmental impact components.

In some embodiments, media sentiment detection module 118 is configured to scrape social media, news articles, online discussion groups, etc. for discussions about specific products or manufactures as they relate to environmental impact components. For example, an online forum discussing a particular products environmental friendly image may suggest one or more positive environmental impact components. Conversely, negative discussions may correlate to one or more negative environmental impact components. For example, an online story about a product marketing's fake environmental aspects may provide a negative correlation.

In some embodiments, a source of environmental impact information may be data addressing packaging method components 120, such as use of oversized packaging, minimal packaging, plastic elements, or sustainable packaging such as paper, cardboard or wood. In one non-limiting example, a product with minimal paper packaging may provide a positive correlation to its environmental impact. Conversely, a product with oversized plastic packaging may provide a negative correlation to its environmental impact.

In some embodiments, packaging methods 120 may not be limited to product packaging, but also include similar considerations for merchant shipping practices. For example, is a small product routinely shipped in an oversized box? Does this merchant include positive environmental impact components (e.g., solar energy) in their warehousing facilities?

In some embodiments, real-time scoring module 102 may be configured to process one or more of the environmental impact source data to generate an environmental impact score. In one non-limiting online shopping embodiment, a product score, a packaging score and a shipping method score (FIG. 3) are individually generated to produce scores for each of these components. Subsequently, these individual scores are aggregated (e.g., averaged, added, mean, etc.) to create an overall product score. Each of the environmental impact source data elements may be assigned different weighting in the score computation. For example, manufacturer data may be given a first weight, customer review data a second weight and social media sentiment a third weight. Alternately, or in addition to, each of the product score components themselves may subsequently be weighted. For example, the product score, deemed very important may be weighted at 50%, the packaging score deemed important assigned a 30% weighting and the shipping score assigned a 20% score when calculating the composite score. The number of environmental impact sources, number of environmental components selected, weighting, and levels of score aggregation may be varied without departing from the scope of the technology described herein.

Scoring results may be stored locally or remotely in database 112 using known storage systems (e.g., clouds server systems). In some embodiments, scoring results may be presented to a consumer by customer decision recommendation module 114 during or prior to a purchase to assist that customer in making an environmentally sound product choice. In some embodiments, a customer purchase history 122, when being presented with environmental impact scoring information, may be useful to the consumer. For example, a historical report (FIG. 5) may provide the consumer with insight as to how environmentally sound their choices may have been or how they are historically trending.

Figure 2:
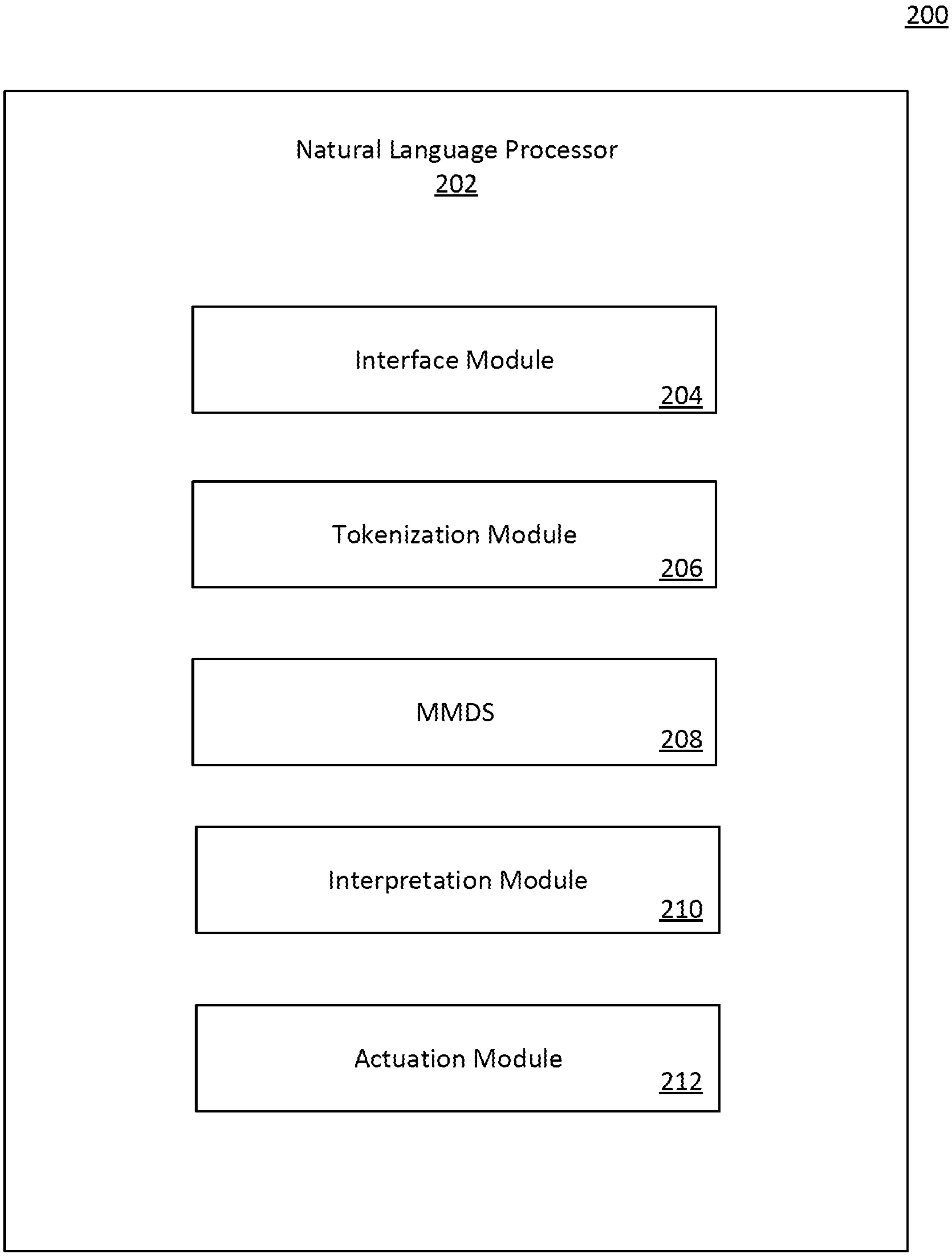
FIG. 2 is a block diagram illustrating a natural language processor, according to some embodiments.

FIG. 2 is a block diagram of a Natural Language Processor (NLP) system 100, according to some embodiments. The number of components in system 100 is not limited to what is shown and other variations in the number of arrangements of components are possible, consistent with some embodiments disclosed herein. The components of FIG. 2 may be implemented through hardware, software, and/or firmware.

While an exemplary embodiment described below may be directed to textual recognition techniques, the technology described herein may be applicable to known or future voice recognition techniques (e.g., a podcast discussing environmental issues focused on a manufacturer, product or industry) or image recognition techniques (optical recognition of environmental icons, sprites, logos, graphic, pictogram, wordmarks, watermarks, etc.) without departing from the scope described herein.

Environmental impact detector 110 may be configured with computer vision technology to interpret imagery (labels, text, symbols, codes, numbers, graphics, audio, etc.) contained in this imagery. However, in some embodiments, to interpret the imagery, the file may need to be transformed into a digital file first.

In a non-limiting example, a printed product label or certification label may directly or indirectly identify environmental impact components. These printed labels may be converted into a digital form by known scanning techniques (i.e., a bar code reader, optical recognition, etc.).

In another non-limiting example, a picture is captured of the label (e.g., by a consumer's smartphone). Alternately, or in addition to, the digital file may be an existing data file. Once the printed label is in digital form, it may need to be processed to extract environmental impact components (e.g., text indicating "sustainably harvested"). In one non-limiting example, the SKU or UPC identify the product and manufacturer. The environmental impact detector may subsequently link to available detailed descriptions of the product at the manufacturer website or alternately, or in addition, to independent sources.

In one embodiment, digital files are processed using natural language processing techniques to identify specific environmental impact language or environmental impact concepts located with the digital files obtained for certification labels 104, customer review data 106, and a SKU or UPC code 108. While specific sources are described herein, any number of sources may be included in the discovery of environmental impact components.

As illustrated, system 100 may comprise a Natural Language Processor (NLP) 202. NLP 202 may include any device, mechanism, system, network, and/or compilation of instructions for performing natural language recognition of specific environmental impact language, environmental impact concepts, or attributes of similar language or concepts consistent with the technology described herein. In the configuration illustrated in FIG. 1, NLP 202 may include an interface module 204, a tokenization module 206, a Master and Meta Data Search (MMDS) module 208, and interpretation module 210, and an actuation module 212. In certain embodiments, module 204, 206, 208, 210, and 212 may each be implemented via any combination of hardware, software, and/or firmware.

Interface module 204 may serve as an entry point or user interface through which one or more words, phrases or sentences can be entered for subsequent similarity scoring (matching) to known environmental impact components. In certain embodiments, interface module 204 may facilitate information exchange among and between NLP 202 and one or more users and/or systems. Interface module 204 may be implemented by one or more software, hardware, and/or firmware components. Interface module 204 may include one or more logical components, processes, algorithms, systems, applications, and/or networks. Certain functions embodied by interface module 204 may be implemented by, for example, HTML, HTML, with JavaScript, C/C++, Java, etc. Interface module 204 may include or be coupled to one or more data ports for transmitting and receiving data from one or more components coupled to NLP 202. Interface module 204 may include or be coupled to one or more user interfaces (e.g., a GUI).

In certain configurations, interface module 204 may interact with one or more applications running on one or more computer systems. Interface module 204 may, for example, embed functionality associated with components of NLP 202 into applications running on a computer system. In one example, interface module 204 may embed NLP 202 functionality into a Web browser or interactive menu application with which a user interacts. For instance, interface module may embed GUI elements (e.g., dialog boxes, input fields, textual messages, etc.) associated with NLP 202 functionality in an application with which a user interacts. Details of applications with which interface module 204 may interact are discussed below in connection with FIGS. 1 and 3-5.

In some embodiments, an interface module 204 may include, be coupled to, and/or integrate one or more systems and/or applications, such as speech recognition facilities and Text-To-Speech (TTS) or Speech-To-Text (STT) engines. Further, interface module 204 may serve as an entry point to one or more voice portals. The voice portal may include, for example, a voice recognition function and an associated application server. The application server may take, for example, the output from the voice recognition function, convert it to a format suitable for other systems, and forward the information to those systems. For example, a podcast discussing environmental issues may be converted to text for subsequent analysis.

Consistent with embodiments of the present invention, interface module 204 may receive natural language queries (e.g., words, phrases or sentences) from a digital data file and forward the queries to tokenization module 206.

Tokenization module 206 may transform natural language queries into tokens as is known. Tokenization module 206 may be implemented by one or more software, hardware, and/or firmware components. Tokenization module 204 may include one or more logical components, processes, algorithms, systems, applications, and/or networks. Tokenization module 206 may include stemming logic, combinatorial intelligence, and/or logic for combining different tokenizers for different languages. In one configuration, tokenization module 206 could receive an ASCII string and output a list of words. Tokenization module 206 may transmit generated tokens to MMDS module 208 via standard machine-readable formats, such as the expendable Markup Language (XML).

MMDS module 208 may be configured to retrieve information using tokens received from tokenization module 206. MMDS module 208 may be implemented by one or more software, hardware, and/or firmware components. MMDS module 208 may include one or more logical components, processes, algorithms, systems, applications, and/or networks. In one configuration, MMDS module 208 may include an API, a searching framework, one or more applications, and one or more search engines.

MMDS module 208 may include an API, which facilitates requests to one or more operating systems and/or applications included in or coupled to MMDS module 208. For example, the API may facilitate interaction between MMDS 208 and one or more structured data archives (e.g., knowledge base).

In one configuration, MMDS 208 may include an API that is exposed to one or more business intelligence systems, such as a Business Warehouse (BW). Such business intelligence systems may include or be based on a data warehouse optimized for a business environment. These business intelligence systems may include various databases, systems, and tools.

In certain embodiments, MMDS module 208 may be configured to maintain a searchable data index, including meta data, master data, meta data descriptions, and/or system element descriptions. For example, the data index may include readable field names (e.g., textual) for meta data (i.e., table names and column headers), master data (i.e., individual field values), and meta data descriptions. The data index may be implemented via one or more hardware, software, and/or firmware components. In one implementation, a searching framework within MMDS 208 may initialize the data index, perform delta indexing, collect meta data, collect master data, and administer indexing.

In certain configurations, MMDS module 208 may include or be coupled to a low level semantic analyzer, which may be embodied by one or more software, hardware, and/or firmware components. The semantic analyzer may include components for receiving tokens from tokenization module 206 and identifying relevant synonyms, hypernyms, concepts, etc. In one embodiment, the semantic analyzer may include and/or be coupled to a table of synonyms, hypernyms, etc. The semantic analyzer may include components for adding such synonyms as supplements to the tokens.

Consistent with embodiments of the present invention, MMDS module 208 may leverage various components and searching techniques/algorithms to search the data index (environmental impact words, phrases, sentences or concepts) using tokens received by tokenization module 206. MMDS module 208 may leverage one or more search engines that employ partial/fuzzy matching processes and/or one or more Boolean, federated, or attribute searching components.

In certain configurations, MMDS module 208 may include one or more software, hardware, and/or firmware components for prioritizing information found in the data index with respect to the semantic tokens. In one example, such components may generate match scores, which represent a qualitative and/or quantitative weight or bias indicating the strength/correlation of the association between elements in the data index and the semantic tokens. For example, some environmental impact words or concepts may be relevant than others. In a non-limiting example, phrases such as "sustainably farmed", "no pesticides", etc. may receive higher consideration and be weighted accordingly.

MMDS module 208 may output to interpretation module 210 a series of meta and/or master data, associated field names, and any associated description fields. MMDS module 208 may also output matching scores to interpretation module 210.

Interpretation module 210 may process and analyze results returned by MMDS module 208. Interpretation module 210 may be implemented by one or more software, hardware, and/or firmware components. Interpretation module 204 may include one or more logical components, processes, algorithms, systems, applications, and/or networks. In one example, interpretation module 204 may include an agent network, in which agents make claims by matching environmental impacts against tokenized natural language queries and context information.

Consistent with embodiments of the technology described herein, interpretation module 210 may be configured to recognize uncertainties associated with information identified by MMDS 208. For example, interpretation module 210 may identify ambiguities, input deficiencies, imperfect conceptual matches, and compound commands. In certain configurations, interpretation module 210 may initiate, configure, and manage user dialogs; specify and manage configurable policies; perform context awareness processes; maintain context information; personalize policies and perform context switches; and perform learning processes.

In operation, interpretation module 210 may interact with one or more other modules within NLP 202. In one example, interpretation module 210 may dynamically interact with MMDS module 208 in order to resolve uncertainties as they arise.

Interpretation module 210 may provide one or more corresponding words or combination of words to actuation module 212. Interpretation module 210 may filter information identified by MMDS module 210 in order to extract environmental impact information that is actually relevant to input words, phrases or sentences. For example, interpretation module 210 may distill information identified by MMDS module 208 down to information that is relevant to the sentences and in accordance with intent. Information provided by interpretation module 210 (i.e., matching elements) may include function calls, meta data, and/or master data. In certain embodiments, the matching elements may be arranged in specific sequence to ensure proper actuation. Further, appropriate relationships and dependencies among and between various elements of the matching elements may be preserved/maintained. For example, meta and master data elements included in a matching element may be used to populate one or more function calls included in matching elements.

Actuation module 212 may process interpreted information provided by interpretation module 210. Actuation module 212 may be implemented by one or more software, hardware, and/or firmware components. Actuation module 212 may include one or more logical components, processes, algorithms, systems, applications, and/or networks. Actuation module 212 may be configurable to interact with one or more system environments.

Consistent with embodiments of the present invention, actuation module 212 may be configured to provide information to one or more users/systems (e.g., environmental impact detector 110 and/or real-time scoring 102).

In certain embodiments, actuation module 212 may be configured to send requests to one or more devices and/or systems using, for example, various APIs.

For clarity of explanation, interface module 204, tokenization module 206, MMDS module 208, interpretation module 210, and actuation module 212 are described as discrete functional elements within NLP 202. However, it should be understood that the functionality of these elements and modules may overlap and/or may exist in fewer elements and modules. Moreover, all or part of the functionality of these elements may co-exist or be distributed among several geographically dispersed locations.

Figure 3:
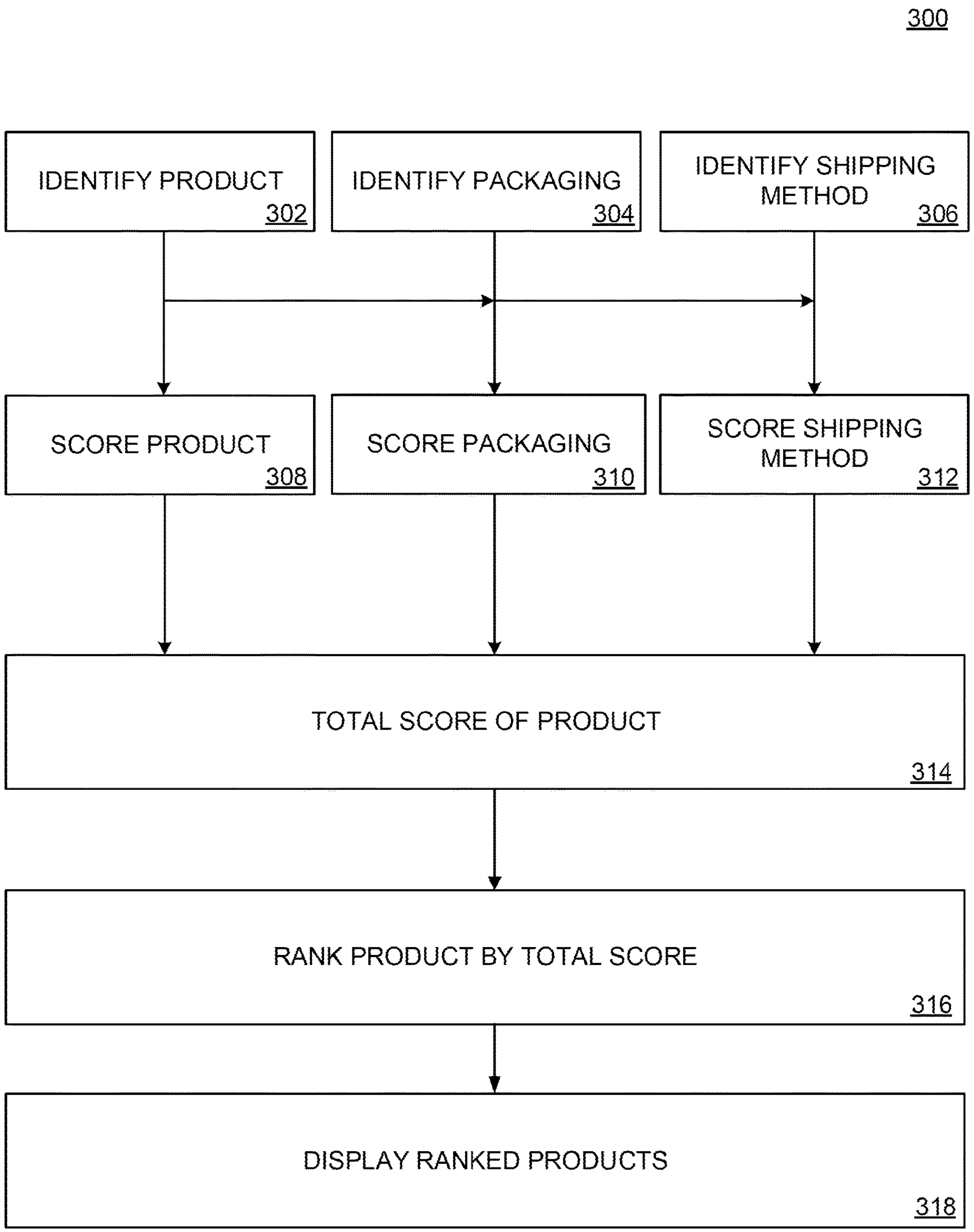
FIG. 3 illustrates a flow diagram for real-time environmental impact scoring, according to some embodiments.

FIG. 3 is a flowchart for a method 300 for scoring and ranking products based on their environmental impact, according to an embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

While an exemplary embodiment will be described for a composite scoring system combining environmental impact scores for a product, packaging and shipping method, single metric scoring is considered within the scope of the technology described herein. In addition, any number of scoring metrics may be combined, in any known fashion, without departing from the scope of the technology described herein. Alternately, or in addition, targeted scoring (certain environmental impact components selected) may be implemented based on any one or combination of identified environmental impact components, environmental impact concepts (such as growing conditions, harvesting conditions, etc.), packaging methods, shipping methods, etc.

As shown, a product is identified 302 by any known or future method. For example, as previously described, the product label is scanned to provide a link to a detailed manufacturer's description of the product. Once environmental impact components are identified, they may be fed to real-time scoring module 102 as weighted or unweighted inputs. A correlation to positive environmental impact components may positively affect a score, while a correlation to negative environmental impact components may negatively affect a score. A combination of positive and negative environmental impact components may be combined (e.g., averaged, added, etc.) to determine the score. For example, if a Marine Stewardship Council label is detected, the system assigns a positive score of A (where A is a predetermined value) in the sustainability dimension with a weighted factor of B (where B is a predetermined value). If the shipping method is expedited shipping, without combining with other potential delivery, a negative score of C (where C is a predetermined value) may be added to the overall impact score with a weighted factor of D (where B is a predetermined value) for shipping. The net impact score could be positive or negative given weights of various factors to customers. Known environmental impact components and there predetermined values and weightings may be arranged in a table ranked in ascending or descending order of overall environmental impact. In one non-limiting example, items arranged at the top or bottom of the environmental impact table may be weighted higher in a scoring model. For example, sustainably farmed products may be highly ranked as positive environmental impact components, while petroleum-based products may be ranked low.

As shown, packaging is identified 304 by any known method. For example, as previously described, the product label is scanned to provide a link to a detailed manufacturer's description of the identified product. Once packaging components are identified, they may be fed to real-time scoring module 102 as weighted or unweighted inputs. A correlation to positive environmental impact components may positively affect a score, while a correlation to negative environmental impact components may negatively affect a score. A combination of positive and negative environmental impact components may be combined to determine the score. Known environmental impact packaging components may be arranged in a table ranked in ascending or descending order of overall environmental impact. In one non-limiting example, items arranged at the top or bottom of the environmental impact table may be weighted higher in a scoring model. For example, cardboard packaging may be ranked high in the environmental impact rankings, while plastic packaging may be ranked low. In another non-limiting example, small form factor packaging may be ranked high, while oversized packaging may be ranked low.

As shown, a shipping method is identified 306 by any known method. For example, shipping methods of various product providers (e.g., online shopping portals) are reviewed as associated with a product identified in 302. Once shipping methods are identified, they may be fed to real-time scoring module 102 as weighted or unweighted inputs. A correlation to positive environmental impact components may positively affect a score, while a correlation to negative environmental impact components may negatively affect a score. A combination of positive and negative environmental impact components may be combined to determine the score. Known environmental impact components may be arranged in a table ranked in ascending or descending order of overall environmental impact. In one non-limiting example, items arranged at the top or bottom of the environmental impact table may be weighted higher in a scoring model. In one non-limiting example, shipping sources (local to the purchaser) may be ranked high in the environmental impact rankings, while overseas shipping may be ranked low. In another non-limiting example, warehouses using solar power may be ranked high, while warehouses not using solar power may be ranked low. In another non-limiting example, ground or rail based shipping may be ranked high, while overnight shipping methods may be ranked low.

As shown, the various environmental impact components 308, 310 and 312 may be combined into a composite score of a product for sale. As with the individual scoring methods, each of these components may be weighted or unweighted. In one non-limiting example, a product environmental impact score may be most important and be weighted at 50% of the total score of the product 314. Packaging may be of a lessor importance overall and be weighted at 30% of the total score, with shipping method scores being weighted at the remaining 20%. Although one skilled in the art will appreciate that other scoring approaches may be used or contemplated within the scope of the technology described herein. For example, new environmental impact components may evolve as products, materials, packaging and shipping methods change over time. In addition, score values and weighting may be selected based on current and/or future environmental considerations.

In some embodiments, based on total scores of a plurality of products, the products are ranked 316. In one non-limiting example, a group of similar products are scored and subsequently ranked within the group. In one non-limiting example, products are ranked within an online store. In another non-limiting example, the same product is ranked across multiple online stores. For example, as shipping methods may vary between vendors, the scores of the same product may be ranked differently across these vendors.

Figure 4:
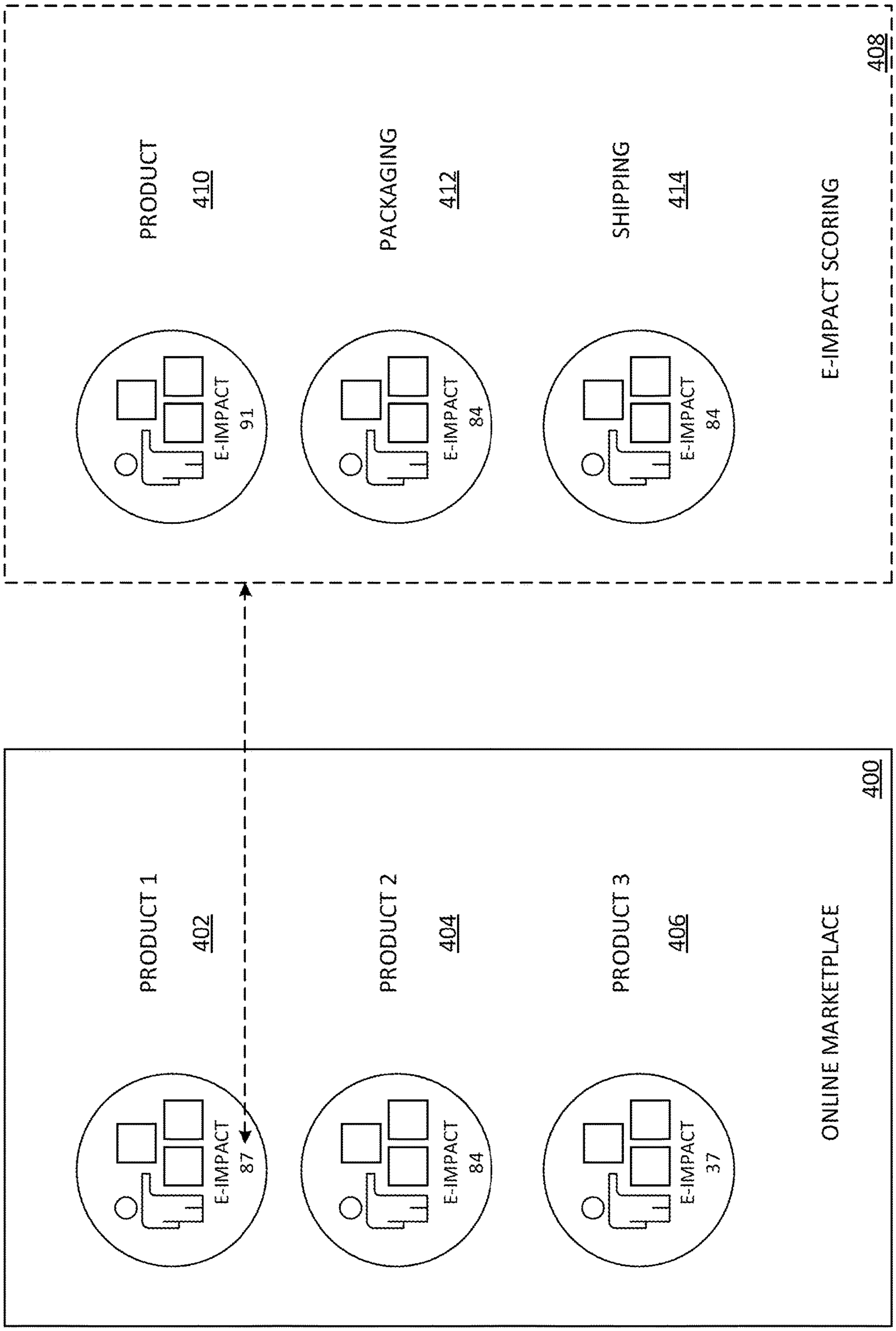
FIG. 4 illustrates an online shopping GUI based on a real-time environmental impact scoring system.

In some embodiments, for example as illustrated in FIG. 4, product environmental impact scores may be displayed 318 for consumers to compare scores and make choices based on these scores.

FIG. 4 illustrates an online shopping GUI based on a real-time environmental impact scoring system. As shown, an online marketplace 400 (e.g., online store) may be displayed on an online shopper's computing device display (e.g., smartphone) as a listing of products and their calculated environmental impact score. For example as shown, product 402 has an E-impact score (environmental impact score) of 87. This score may indicate a high or low environmental impact depending on a selected scoring system designation. For example, a scoring system in one aspect reflects a high score as being very sustainable and therefore good for the environment. However, the same scoring system may, in another aspect, reflect a low score as being good for the environment.

In some embodiments, this score may also be revealed to the consumer by its score components 408, such as a product score 410 of 91, a packaging score 112 of 84 and a shipping score 412 of 84. Additional products 404 and 406 may also be displayed with their calculated E-impact scores. By providing these environmental impact product scores to the online shopper at the time of purchase, the shopper may be able to make better-informed environmentally based decisions.

While products are shown with specific scores in FIG. 4, in some embodiments, the scores may fall into descriptive ranges and be labeled accordingly. For example, instead of a specific score, items above or below a selected score threshold (or range of scores) may simply be labeled as "environmental friendly", "environmentally unfriendly", "high environmental impact rating", "low environmental impact rating", "neutral environmental impact rating", "low-environmental impact", etc. Alternately, or in addition to, the products rated highly sustainable may simply be labeled with an appropriate icon, like five stars for environmental impact.

Figure 5:
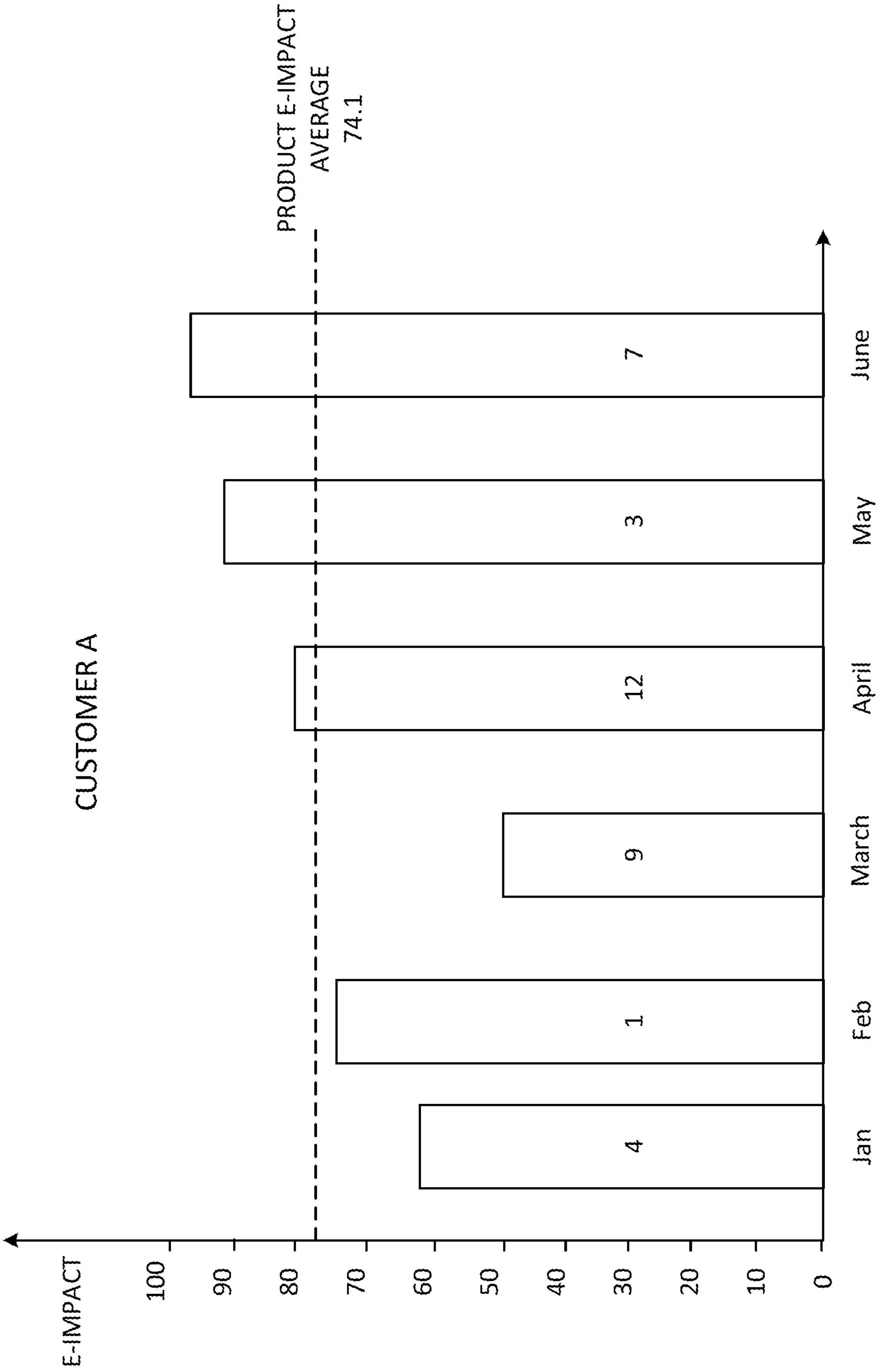
FIG. 5 illustrates a consumer report of an environmental impact of purchases over time, according to some embodiments.

FIG. 5 illustrates a consumer report of an environmental impact of purchases over time, according to some embodiments. From FIG. 1, customer purchase history module 122 assists a customer in tracking their purchased products and associated environmental impact scores. As part of this assistance, in some embodiments, a report may be generated to graphically illustrate a customer's purchases and average E-impact scores for those purchases. As shown in the chart, in January a customer made four purchases with an average E-impact score of 62. In some embodiments, over time, an overall average purchased product score may be identified on the graph (shown as 74.1). While shown as an average, any other known mathematical metric may be substituted, such as mean or total score, without departing from the scope of the technology described herein.

Figure 6:
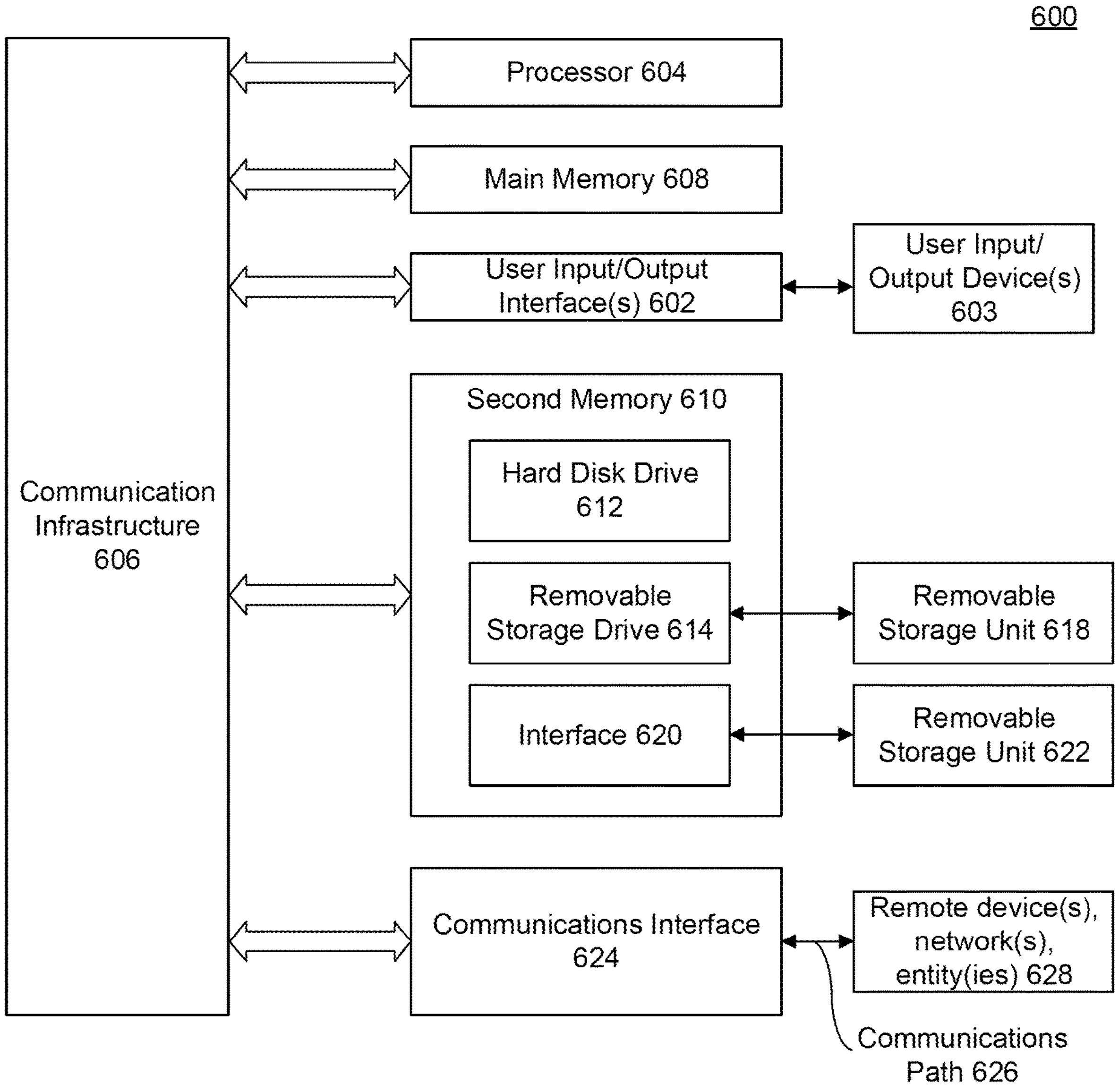
FIG. 6 is an example computer system useful for implementing various embodiments.

Various embodiments can be implemented, for example, using one or more computer systems, such as computer system 600 shown in FIG. 6. Computer system 600 can be used, for example, to implement method 300 of FIG. 3. Computer system 600 can be any computer capable of performing the functions described herein.

Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics-processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure of bus 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for real-time environmental impact assessment with exposure of false environmental data, comprising:

extracting, by at least one processor and at a point of sale environment during an active product browsing session, a first plurality of environmental impact components associated with a product, a packaging of the product, and a shipping of the product from a plurality of images each corresponding to a respective vendor across a plurality of vendors via a computer vision algorithm in real-time, wherein the first plurality of environmental impact components comprises one or more product description hyperlinks extracted from the plurality of images;

scraping, by the at least one processor, the one or more product description hyperlinks to obtain first text data corresponding to the first plurality of environmental impact components;

scraping, by the at least one processor, one or more verified third-party data sources for second text data corresponding to a second plurality of environmental impact components associated with the product, the packaging of the product, and the shipping of the product across the plurality of vendors, wherein the one or more verified third-party data sources are independent from control of a manufacturer of the product;

tokenizing, using a natural language processor, the first text data and the second text data into a plurality of semantic tokens;

generating, using the natural language processor, a plurality of match scores based on relevancy-weighted environment impact phrases stored inside a searchable data index, each match score representing a quantitative correlation strength between a respective semantic token and the environment impact phrases;

detecting, using the natural language processor based on the plurality of match scores, negative environmental indicators associated with the first text data;

assigning, by the at least one processor, differential weights to the first plurality of environmental impact components and the second plurality of environmental impact components, wherein the first plurality of environmental impact components receive lower weights than the second plurality of environmental impact components when the negative environmental indicators are detected;

calculating, by the at least one processor within the active product browsing session, product scores for the product, packaging scores for the packaging, and shipping scores for the shipping for each vendor based on the first plurality of weighted environmental impact components and the second plurality of weighted environmental impact components;

generating, by the at least one processor, a plurality of composite environmental impact scores based on the product scores, packaging scores, and shipping scores, each composite environmental impact score corresponding to the respective vendor of the plurality of vendors;

determining, by the at least one processor, whether any of the plurality of composite environmental impact scores fall below a sustainability threshold; and generating, by the at least one processor and during an active browsing session, a recommendation for an alternative product having the composite environmental impact score above the sustainability threshold.

2. The method of claim 1, further comprising:

ranking, by the at least another processor, the product and the alternative product based on the plurality of composite environmental impact scores and the composite environmental impact score corresponding to the alternative product;

displaying, by the at least one processor, the ranking of the product against the alternative product.

3. The method of claim 1, wherein the first plurality of environmental impact components and the second plurality of environmental impact components comprise manufacturer product packaging, vendor product packaging, or data associated with any of: product labels, product ingredients, product descriptions or product reviews.

4. The method of claim 3, further comprising:

analyzing, by the natural language processor, any of the: product labels, product ingredients, product descriptions or product reviews to capture the data.

5. The method of claim 1, wherein the first plurality of environmental impact components and the second plurality of environmental impact components comprise data associated with any of: regulatory data, third-party industry data, fair trade data, supply chain data, or certification labels.

6. The method of claim 1, wherein the first plurality of environmental impact components comprise data associated with any of: a Stock Keeping Unit (SKU) code or a Universal Product Code (UPC) code.

7. The method of claim 6, the extracting further comprising:

retrieving, from a database, the first plurality of environmental impact components, based on the SKU code or UPC code.

8. The method of claim 1, the extracting further comprising:

analyzing, by the computer vision algorithm, manufacturer product packaging or vendor product packaging to further identify materials used to package the product.

9. The method of claim 8, the calculating further comprising:

calculating a carbon footprint of the identified materials associated with the product.

10. The method of claim 9, wherein the materials comprise any of:

paper, plastic, cardboard, polystyrene foam (XPS), synthetics, metals or wood.

11. The method of claim 1, the scraping the one or more verified third-party data sources further comprising:

identifying the second plurality of environmental impact components based on analyzing social media sentiment data or product consumer review data.

12. The method of claim 1, further comprising:

storing, by the at least one processor, the plurality of composite environmental impact scores in a database for subsequent scoring of the product.

13. The method of claim 1, further comprising:

capturing, by the at least one processor, a purchase of the product and its associated environmental impact score;

capturing, by the at least one processor, a customer profile associated with the purchase; and storing, by the at least one processor, environmental impact scores for the customer profile in a database.

14. The method of claim 13, further comprising:

displaying, by the at least one processor, a chart of the environmental impact scores over time associated with the customer profile.

15. A system for real-time environmental impact assessment with exposure of false environmental data, comprising:

a natural language processor;

a memory; and at least one processor coupled to the memory and configured to:

extract, at a point of sale environment during an active product browsing session, a first plurality of environmental impact components associated with a product, a packaging of the product, and a shipping of the product from a plurality of images each corresponding to a respective vendor across a plurality of vendors via a computer vision algorithm in real-time, wherein the first plurality of environmental impact components comprises one or more product description hyperlinks extracted from the plurality of images;

scrape the one or more product description hyperlinks to obtain first text data corresponding to the first plurality of environmental impact components;

scrape one or more verified third-party data sources for second text data corresponding to a second plurality of environmental impact components associated with the product, the packaging of the product, and the shipping of the product across the plurality of vendors, wherein the verified third-party data sources are independent from control of a manufacturer of the product;

tokenize, using the natural language processor, the first text data and the second text data into a plurality of semantic tokens;

generate, using the natural language processor, a plurality of match scores based on relevancy-weighted environment impact phrases stored inside a searchable data index, each match score representing a quantitative correlation strength between a respective semantic token and the relevancy-weighted environment impact phrases;

detect, using the natural language processor based on the plurality of match scores, negative environmental indicators associated with the first text data;

assign differential weights to the first plurality of environmental impact components and the second plurality of environmental impact components, wherein the first plurality of environmental impact components receive lower weights than the second plurality of environmental impact components when the negative environmental indicators are detected;

calculate, within the active product browsing session, product scores for the product, packaging scores for the packaging, and shipping scores for the shipping for each vendor based on the first plurality of weighted environmental impact components and the second plurality of weighted environmental impact components;

generate a plurality of composite environmental impact scores based on the product scores, packaging scores, and shipping scores, each composite environmental impact score corresponding to the respective vendor of the plurality of vendors;

determine whether any of the plurality of composite environmental impact scores fall below a sustainability threshold; and generate, during the active product browsing session, a recommendation for an alternative product having the composite environmental impact score above the sustainability threshold.

16. The system of claim 15, the at least one processor further configured to:

capture a purchase of the product and its associated environmental impact score;

capture a customer profile associated with the purchase; and aggregate environmental impact scores for the customer profile in a database.

17. A non-transitory computer-readable device having instructions stored thereon that, when executed by at least one computing device, causes the at least one computing device to perform operations for real-time environmental impact assessment with exposure of false environmental data, the operations comprising:

extracting, at a point of sale environment during an active product browsing session, a first plurality of environmental impact components associated with a product, a packaging of the product, and a shipping of the product from a plurality of images each corresponding to a respective vendor across a plurality of vendors via a computer vision algorithm in real-time, wherein the first plurality of environmental impact components comprises one or more product description hyperlinks extracted from the plurality of images;

scraping the one or more product description hyperlinks to obtain first text data corresponding to the first plurality of environmental impact components;

scraping one or more verified third-party data sources for second text data corresponding to a second plurality of environmental impact components associated with the product, the packaging of the product, and the shipping of the product across the plurality of vendors, wherein the verified third-party data sources are independent from control of a manufacturer of the product;

tokenizing, using a natural language processor, the first text data and the second text data into a plurality of semantic tokens;

generating, using the natural language processor, a plurality of match scores based on relevancy-weighted environment impact phrases stored inside a searchable data index, each match score representing a quantitative correlation strength between a respective semantic token and the environment impact phrases;

detecting, using the natural language processor based on the plurality of match scores, negative environmental indicators associated with the first text data;

assigning differential weights to the first plurality of environmental impact components and the second plurality of environmental impact components, wherein the first plurality of environmental impact components receive lower weights than the second plurality of environmental impacts when the negative environmental indicators are detected;

calculating, within the active product browsing session, product scores for the product, packaging scores for the packaging, and shipping scores for the shipping for each vendor based on the first plurality of weighted environmental impact components and the second plurality of weighted environmental impact components;

generating a plurality of composite environmental impact scores based on the product scores, packaging scores, and shipping scores, each composite environmental impact score corresponding the respective vendor of the plurality of vendors;

determining whether any of the plurality of composite environmental impact scores fall below a sustainability threshold; and generating, during the active product browsing session, a recommendation for an alternative product having the composite environmental impact score above the sustainability threshold.

18. The method of claim 1, wherein the shipping score accounts for at least one of a distance the product is shipped or a manner of transportation used to ship the product.

19. The method of claim 1, the tokenizing further comprising:

identifying, by a low-level semantic analyzer, synonyms or hypernyms related to the text data; and supplementing the plurality of semantic tokens with the identified synonyms or hypernyms.

20. The method of claim 1, the generating the plurality of match scores further comprising:

initializing the searchable data index with metadata, master data, and metadata descriptions of known environment impact phrases; and performing delta indexing to update the searchable data index with new environment impact phrases.

* * * * *